US012800949B2

(12) United States Patent
Chien

(10) Patent No.: US 12,800,949 B2
(45) Date of Patent: Nov. 17, 2026

(54) SMART CONTACT LENS

(71) Applicant: AZUREWAVE TECHNOLOGIES, INC., New Taipei City (TW)

(72) Inventor: Huang-Chan Chien, New Taipei City (TW)

(73) Assignee: AZUREWAVE TECHNOLOGIES, INC., New Taipei City (TW)

( * ) Notice: Subject to any disclaimer, the term of this patent is extended or adjusted under 35 U.S.C. 154(b) by 222 days.

(21) Appl. No.: 18/784,974

(22) Filed: Jul. 26, 2024

(65) Prior Publication Data

US 2025/0355283 A1 Nov. 20, 2025

(30) Foreign Application Priority Data

May 15, 2024 (CN) ......................... 202410606442.4

(51) Int. Cl.
*G02C 11/00* (2006.01)
*G02C 7/04* (2006.01)

(52) U.S. Cl.
CPC ................ *G02C 11/10* (2013.01); *G02C 7/04* (2013.01)

(58) Field of Classification Search
CPC .......... G02C 11/10; G02C 7/04; G02C 7/083; B29D 11/00826; B29D 11/00817
See application file for complete search history.

(56) References Cited

U.S. PATENT DOCUMENTS

2015/0005604 A1* 1/2015 Biederman .............. G02C 7/04 351/158
2017/0042480 A1* 2/2017 Gandhi .............. A61B 5/14546
2025/0070457 A1* 2/2025 Yoo ........................ H01Q 1/273

FOREIGN PATENT DOCUMENTS

| | | | |
|---|---|---|---|
| CN | 104473616 | A | 4/2015 |
| TW | I588563 | B | 6/2017 |

* cited by examiner

*Primary Examiner* — Ephrem Z Mebrahtu
(74) *Attorney, Agent, or Firm* — Li & Cai Intellectual Property Office

(57) ABSTRACT

A smart contact lens includes a lens body, a stepped-impedance antenna, and an electronic chip. The lens body includes an optical portion and an annular wearing portion that surrounds the optical portion. The stepped-impedance antenna is embedded in the annular wearing portion. The stepped-impedance antenna includes a first step portion, a second step portion, and a third step portion. The second and third step portions are respectively connected to two ends of the first step portion, and each have a width greater than that of the first step portion. A central angle of the first step portion is within a range from 160 degrees to 180 degrees, and a difference between two central angles of the second and third step is less than or equal to 15 degrees. The electronic chip is embedded in the annular wearing portion and is electrically coupled to the stepped-impedance antenna.

10 Claims, 10 Drawing Sheets

SMART CONTACT LENS

CROSS-REFERENCE TO RELATED PATENT APPLICATION

This application claims the benefit of priority to China Patent Application No. 202410606442.4, filed on May 15, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a contact lens, and more particularly to a smart contact lens.

BACKGROUND OF THE DISCLOSURE

A conventional smart contact lens includes various electronic components embedded therein, but an antenna of the conventional smart contact lens has not been designed with a suitable structure for being embedded, such that the conventional contact lens is still under development and not yet widely sold.

SUMMARY OF THE DISCLOSURE

In response to the above-referenced technical inadequacies, the present disclosure provides a smart contact lens for effectively improving on the issues associated with conventional smart contact lenses.

In order to solve the above-mentioned problems, one of the technical aspects adopted by the present disclosure is to provide a smart contact lens, which includes: a lens body, a stepped-impedance antenna, and an electronic chip. The lens body includes an optical portion and an annular wearing portion that surrounds the optical portion. The optical portion defines a central axis passing through a center of the annular wearing portion. The stepped-impedance antenna has a circular ring shape and is embedded in the lens body along the annular wearing portion. The stepped-impedance antenna includes: a first step portion, a second step portion, and a third step portion. The first step portion has a first width and two connection ends. The first step portion has a first central angle with respect to the central axis. The first central angle is within a range from 160 degrees to 180 degrees. The second step portion is connected to one of the two connection ends of the first step portion and has a second width that is within a range from 180% to 220% of the first width. The second step portion has a second central angle with respect to the central axis. The third step portion is connected to another one of the two connection ends of the first step portion and has a third width that is within a range from 180% to 220% of the first width. The third step portion has a third central angle with respect to the central axis. Moreover, a difference between the second central angle and the third central angle is less than or equal to 15 degrees. The electronic chip is embedded in the annular wearing portion and is electrically coupled to the stepped-impedance antenna for wirelessly transmitting signals.

In order to solve the above-mentioned problems, another one of the technical aspects adopted by the present disclosure is to provide a smart contact lens, which includes: a lens body, a stepped-impedance antenna, and an electronic chip. The lens body includes an optical portion and an annular wearing portion that surrounds the optical portion. The stepped-impedance antenna has a circular ring shape and is embedded in the lens body along the annular wearing portion. The stepped-impedance antenna includes: a first step portion, a second step portion, and a third step portion. The first step portion has a first width and two connection ends. The first step portion has a first central angle that is within a range from 160 degrees to 180 degrees. The second step portion is connected to one of the two connection ends of the first step portion and has a second width that is within a range from 180% to 220% of the first width. The second step portion has a second central angle. The third step portion is connected to another one of the two connection ends of the first step portion and has a third width that is within a range from 180% to 220% of the first width. The third step portion has a third central angle. Moreover, a difference between the second central angle and the third central angle is less than or equal to 15 degrees. The electronic chip is embedded in the annular wearing portion and is electrically coupled to the stepped-impedance antenna.

Therefore, the smart contact lens of the present disclosure is provided with the first step portion, the second step portion, and the third step portion having specific structural conditions (e.g., a relative arrangement of the first central angle, the second central angle, and the third central angle, and/or a relative arrangement of the first width, the second width, and the third width), so that the stepped-impedance antenna in a limited space can be provided for effectively increasing an equivalent inductance and reducing a resonance frequency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
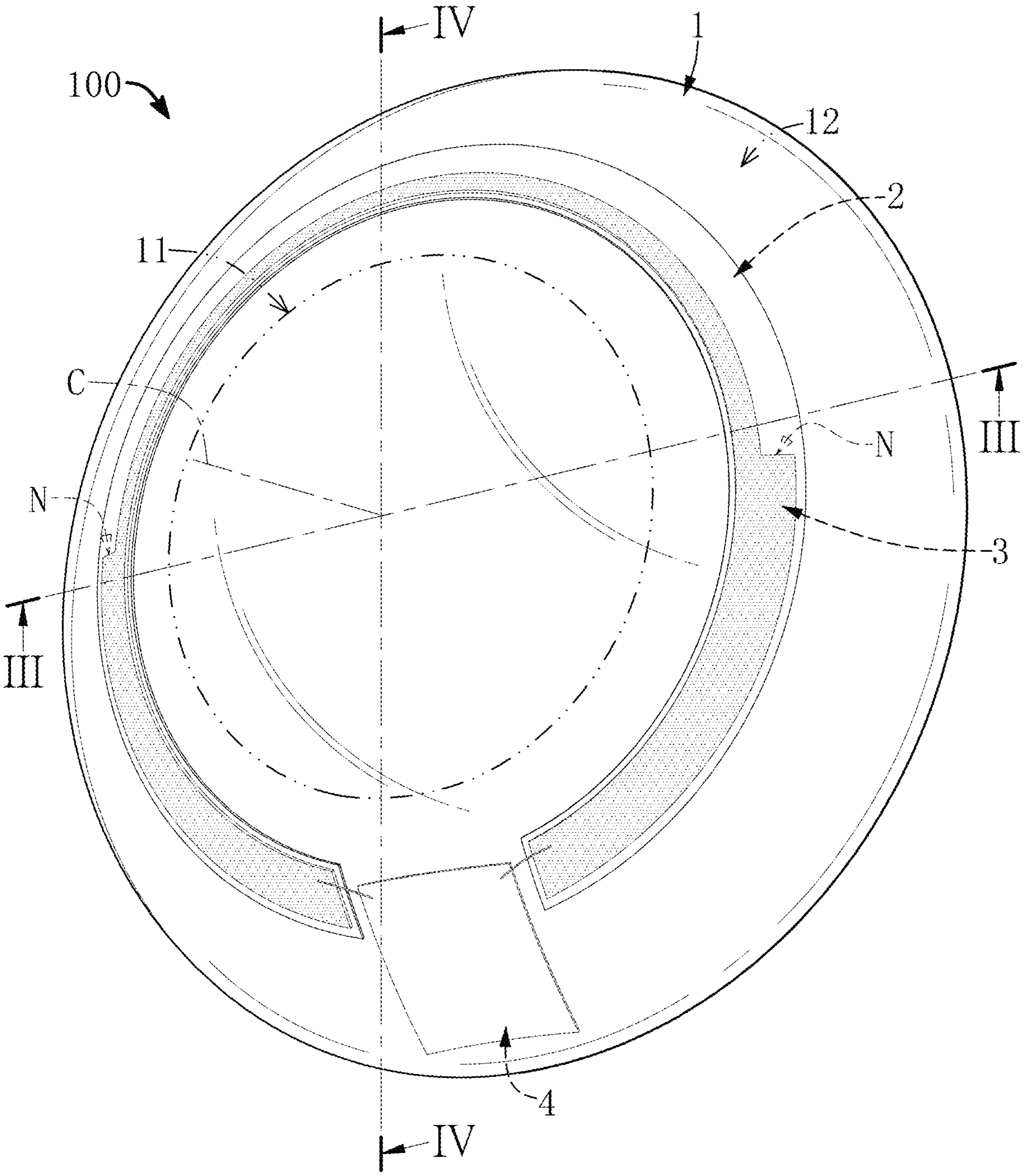
FIG. 1 is a schematic perspective view of a smart contact lens according to a first embodiment of the present disclosure.
Figure 2:
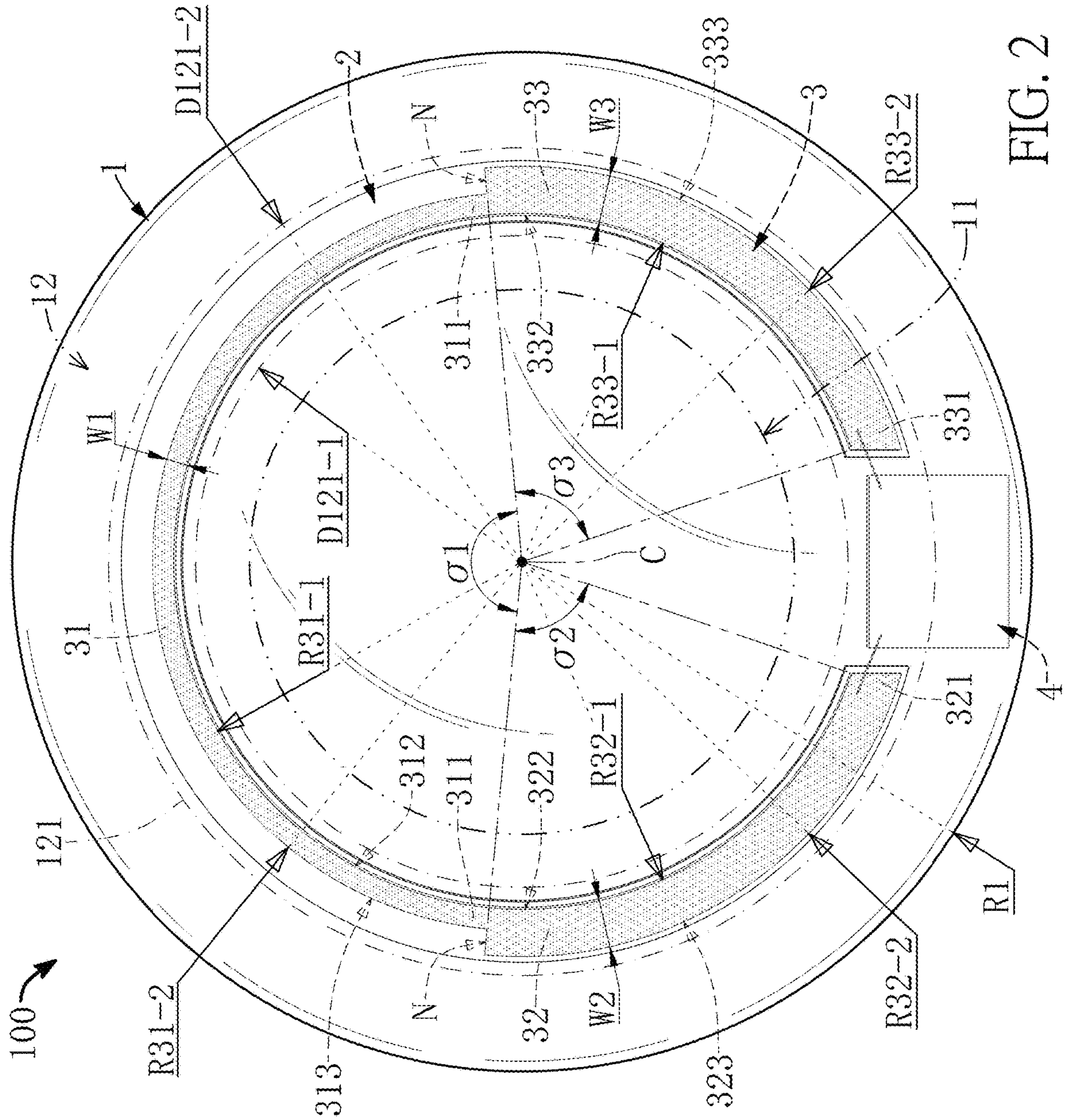
FIG. 2 is a schematic top view of FIG. 1.
Figure 3:
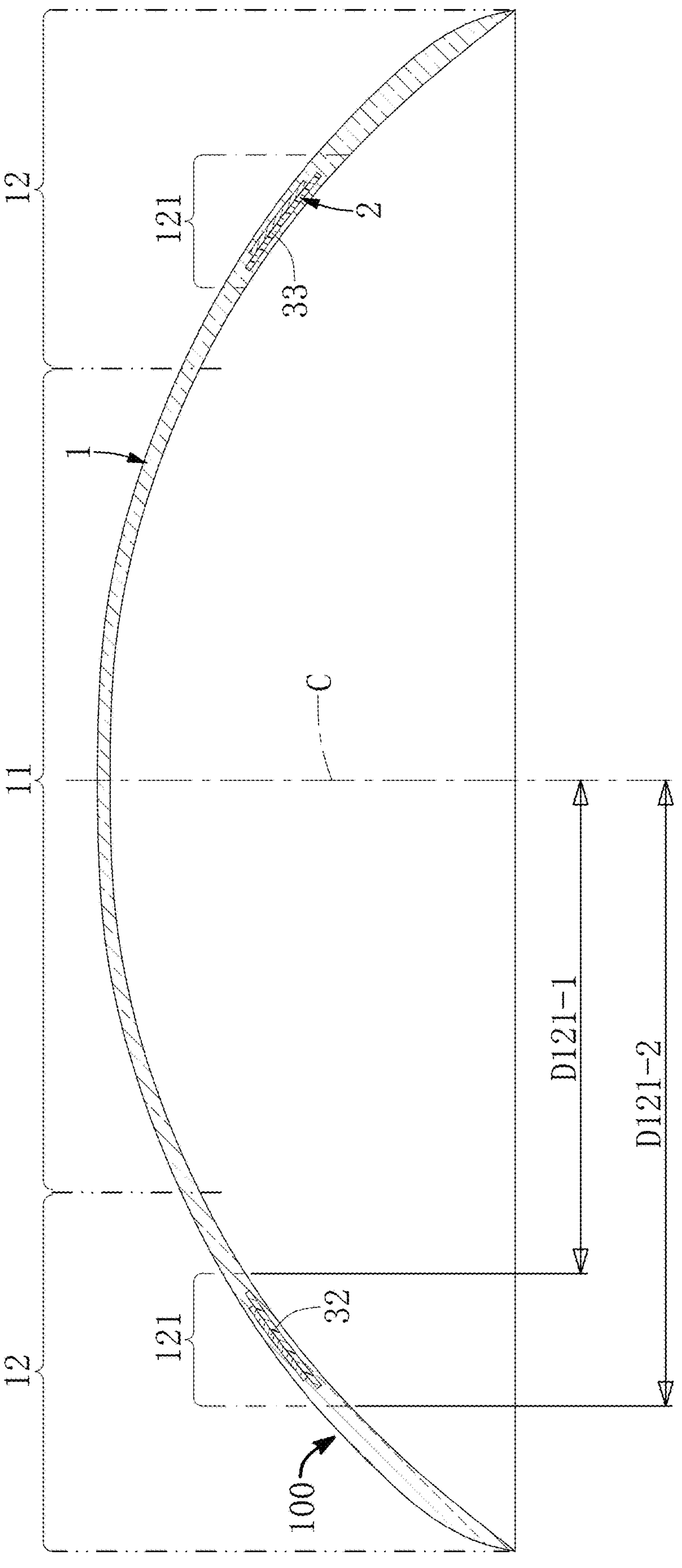
FIG. 3 is a schematic cross-sectional view taken along line III-III of FIG. 1.
Figure 4:
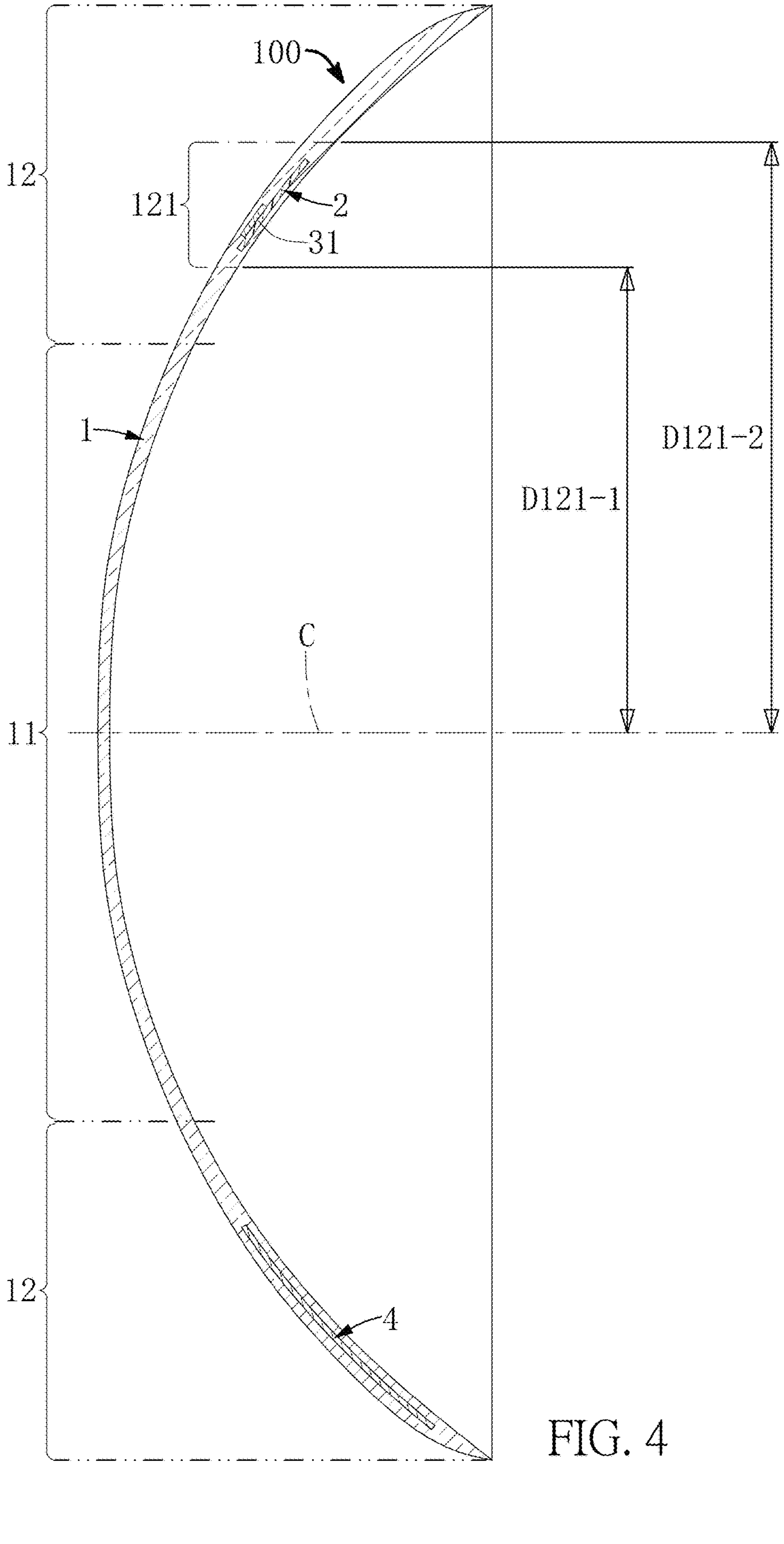
FIG. 4 is a schematic cross-sectional view taken along line IV-IV of FIG. 1.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure is provided. The present embodiment provides a smart contact lens 100, which is preferably formed with a wireless energy receiving function and/or a wireless signal transmission function. The smart contact lens 100 can be worn on or embedded in a user's eye according to practical requirements, and the present disclosure is not limited thereto.

Moreover, the smart contact lens 100 in the present embodiment includes a lens body 1, a flexible carrier 2 embedded in the lens body 1, a stepped-impedance antenna 3 formed on the flexible carrier 2 and embedded in the lens body 1, and an electronic chip 4 that is embedded in the lens body 1, but the present disclosure is not limited thereto. For example, in other embodiments of the present disclosure not shown in the drawings, the smart contact lens 100 can be provided without the flexible carrier 2 according to design requirements, and the stepped-impedance antenna 3 is independently and entirely embedded in the lens body 1 and is not exposed from the lens body 1.

The lens body 1 includes an optical portion 11 and an annular wearing portion 12 that surrounds the optical portion 11. The optical portion 11 defines a central axis C passing through a center of the annular wearing portion 12. In the present embodiment, the optical portion 11 can be formed with a corrective function for a refractive error according to design requirements, and the refractive error includes at least one of a hyperopia, a myopia, an astigmatism, a presbyopia, and an astigmatism-presbyopia. Or, the optical portion 11 can be formed without the corrective function according to design requirements.

Moreover, in order to achieve functions of the smart contact lens 100, the annular wearing portion 12 defines an annular layout region 121, and the stepped-impedance antenna 3 and the flexible carrier 2 are arranged in the annular layout region 121. In the present embodiment, an inner radius D121-1 of the annular layout region 121 is preferably within a range from 4 mm to 5.9 mm, and an outer radius D121-2 of the annular layout region 121 is preferably within a range from 4.1 mm to 6 mm.

The flexible carrier 2 and the stepped-impedance antenna 3 are entirely embedded in the lens body 1 along the annular wearing portion 12. That is to say, the flexible carrier 2 and the stepped-impedance antenna 3 are not exposed from the lens body 1. The size and shape of the flexible carrier 2 in the present embodiment are presented in a structure that is capable of carrying the stepped-impedance antenna 3, but the present disclosure is not limited thereto. For example, in other embodiments of the present disclosure not shown in the drawings, the flexible carrier 2 can be adjusted or changed according to practical requirements.

Specifically, the stepped-impedance antenna 3 in the present embodiment has a circular ring shape and is integrally formed as a single one-piece structure. The stepped-impedance antenna 3 includes a first step portion 31, a second step portion 32, and a third step portion 33, the latter two of which are respectively arranged at two opposite ends of the first step portion 31. The second step portion 32 and the third step portion 33 are in a mirror symmetrical arrangement, but the present disclosure is not limited thereto. In order to realize the present embodiment, the following description provides clearer details on parameters (e.g., a width, a radius, and a central angle) of each part of smart contact lens 100 defined in a top view angle.

The first step portion 31 has a circular arc shape having two connection ends 311, the second step portion 32 has a circular arc shape and is connected to one of the two connection ends 311 of the first step portion 31, and the third step portion 33 has a circular arc shape and is connected to another one of the two connection ends 311 of the first step portion 31. In the present embodiment, a center of circle of the first step portion 31, a center of circle of the second step portion 32, and a center of circle of the third step portion 33 are located on the central axis C, but the present disclosure is not limited thereto. For example, in other embodiments of the present disclosure not shown in the drawings, at least one of the center of circle of the first step portion 31, the center of circle of the second step portion 32, and the center of circle of the third step portion 33 can be spaced apart from the central axis C by a smaller offset according to design requirements.

In the present embodiment, the first step portion 31 has a first central angle $\sigma 1$ with respect to the central axis C, and the first central angle $\sigma 1$ is within a range from 160 degrees to 180 degrees. Moreover, the second step portion 32 has a second central angle $\sigma 2$ with respect to the central axis C, and the third step portion 33 has a third central angle $\sigma 3$ with respect to the central axis C.

Specifically, a difference between the second central angle $\sigma 2$ and the third central angle $\sigma 3$ is less than or equal to 15 degrees, and any one of the second central angle $\sigma 2$ and the third central angle $\sigma 3$ is preferably within a range from 20% to 50% of the first central angle σ1. It should be noted that the difference between the second central angle σ2 and the third central angle σ3 is preferably less than or equal to 5 degrees, and the second central angle σ2 can be within a range from 45 degrees to 100 degrees, but the present disclosure is not limited thereto.

For example, in other embodiments of the present disclosure not shown in the drawings, when the center of circle of the first step portion 31, the center of circle of the second step portion 32, and the center of circle of the third step portion 33 are spaced apart from the central axis C, any one of the first central angle σ1, the second central angle σ2, and the third central angle σ3 can be defined as not corresponding to the central axis C.

Moreover, the first step portion 31 has a structure of a same width (e.g., a first width W1), the lens body 1 has a radius R1 with respect to the central axis C, and the first width W1 is within a range from 4% to 30% of the radius R1. The second step portion 32 has a structure of a same width (e.g., a second width W2), and the second width W2 is within a range from 180% to 220% of the first width W1. The third step portion 33 has a structure of a same width (e.g., a third width W3), and the third width W3 is within a range from 180% to 220% of the first width W1.

In the present embodiment, the second width W2 of the second step portion 32 can be substantially equal to the third width W3 of the third step portion 33, but the present disclosure is not limited thereto. For example, in other embodiments of the present disclosure not shown in the drawings, the second width W2 and the third width W3 can be different according to design requirements.

Specifically, an inner edge 312 of the first step portion 31 is flush with an inner edge 322 of the second step portion 32 and an inner edge 332 of the third step portion 33, thereby being jointly formed as a circular edge having a substantial C-shape. Moreover, an outer edge 313 of the first step portion 31 is spaced apart from each of an outer edge 323 of the second step portion 32 and an outer edge 333 of the third step portion 33 by a same step difference, and the outer edge 313 of the first step portion 31 and each of the second step portion 32 and the third step portion 33 jointly form a notch N.

In other words, a first inner radius R31-1 between the inner edge 312 of the first step portion 31 and the central axis C is equal to a second inner radius R32-1 between the inner edge 322 of the second step portion 32 and the central axis C, and is also equal to a third inner radius R33-1 between the inner edge 332 of the third step portion 33 and the central axis C.

The electronic chip 4 is embedded in the annular wearing portion 12. In other words, the electronic chip 4 is not exposed from the lens body 1. Moreover, the electronic chip 4 is electrically coupled to the stepped-impedance antenna 3 for wirelessly transmitting signals. In the present embodiment, the electronic chip 4 is arranged between a distal end 321 of the second step portion 32 away from the first step portion 31 and a distal end 331 of third step portion 33 away from the first step portion 31, and the electronic chip 4 is preferably connected to the distal end 321 of the second step portion 32 and the distal end 331 of third step portion 33. The connection between the electronic chip 4 and any one of the distal end 321 of the second step portion 32 and the distal end 331 of third step portion 33 can be established in a wire-bonding manner or a flip-chip manner according to design requirements, and the present disclosure is not limited thereto.

In summary, the smart contact lens 100 of the present embodiment is provided with the first step portion 31, the second step portion 32, and the third step portion 33 having specific structural conditions (e.g., a relative arrangement of the first central angle σ1, the second central angle σ2, and the third central angle σ3; a relative arrangement of the first width W1, the second width W2, and the third width W3), so that the stepped-impedance antenna 3 in a limited space (e.g., the annular wearing region 121) can be provided for effectively increasing an equivalent inductance and reducing a resonance frequency.

It should be noted that the electronic chip 4 in the present embodiment is an application specific integrated circuit (ASIC) chip that can be used for communication and power supply. For example, the electronic chip 4 can be used for communication through a wireless transmission technology (e.g., a radio frequency identification technology), and the electronic chip 4 can include an analog-to-digital converter (ADC) function for being (electrically) connected to a sensor.

Moreover, the smart contact lens 100 in the present embodiment can further be in cooperation with other devices. For example, in other embodiments of the present disclosure not shown in the drawings, the smart contact lens 100 can be wirelessly connected to any wearable device (e.g., a reader assembled to glasses or a neck worn reader) that is worn on a user, and the wearable device (or the reader) can provide the smart contact lens 100 with electricity, sensing, or signal feedback through a conventional wireless transmission (e.g., RFID) technology or other wireless sensing technologies, thereby being applied to an intelligent monitoring, an intelligent treatment, an AR service, or other intelligent applications.

Second Embodiment

Figure 5:
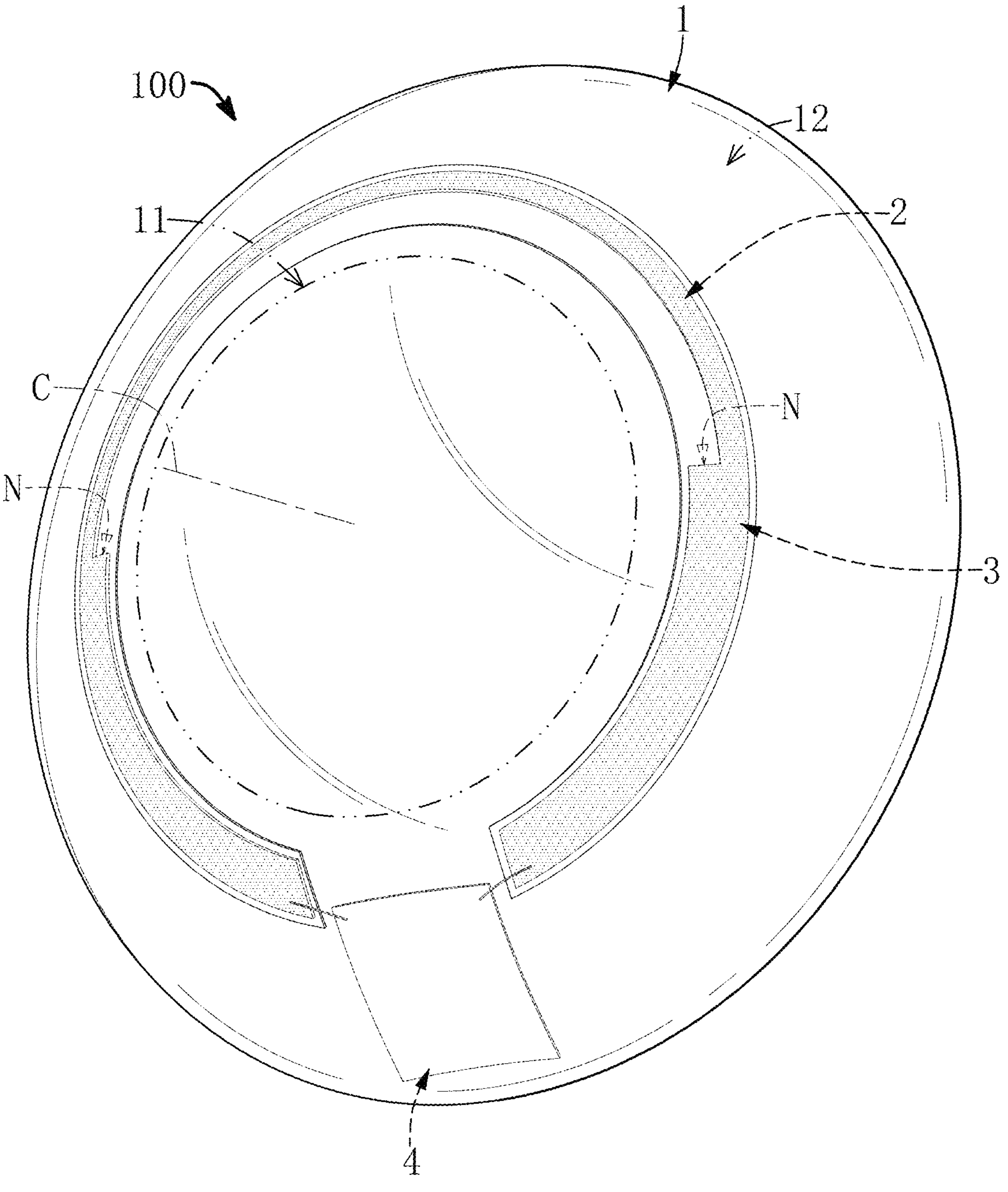
FIG. 5 is a schematic perspective view of the smart contact lens according to a second embodiment of the present disclosure.
Figure 6:
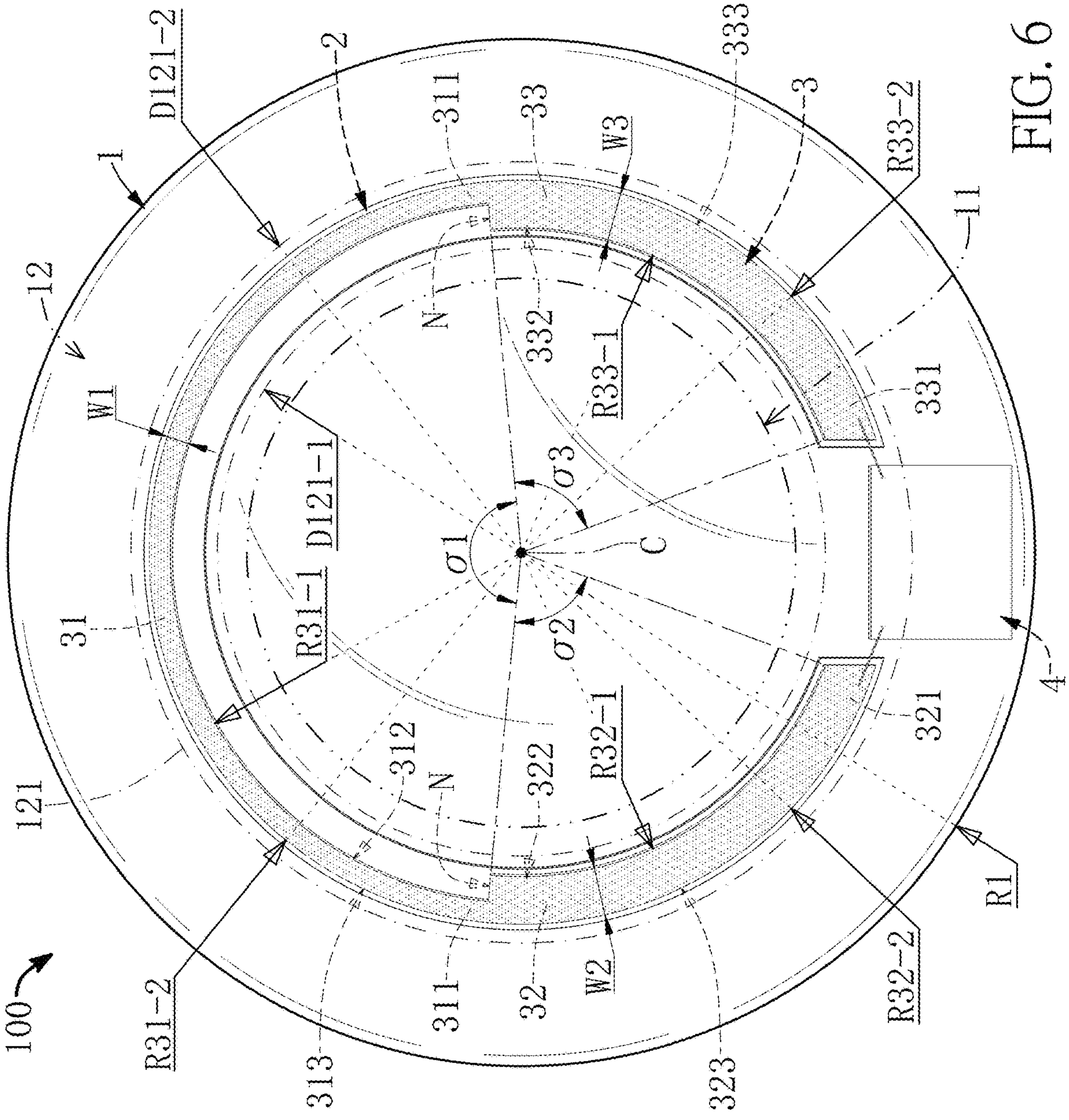
FIG. 6 is a schematic top view of FIG. 5.

Referring to FIG. 5 and FIG. 6, a second embodiment of the present disclosure, which is similar to the first embodiment of the present disclosure, is provided. For the sake of brevity, descriptions of the same components in the first and second embodiments of the present disclosure (e.g., the lens body 1 and electronic chip 4) will be omitted herein, and the following description only discloses different features between the first and second embodiments.

In the present embodiment, an outer edge 313 of the first step portion 31 is flush with an outer edge 323 of the second step portion 32 and an outer edge 333 of the third step portion 33, thereby being jointly formed as a circular edge substantially having a C-shape. Moreover, an inner edge 312 of the first step portion 31 is spaced apart from each of an inner edge 322 of the second step portion 32 and an inner edge 332 of the third step portion 33 by a same step difference, and the inner edge 312 of the first step portion 31 and each of the second step portion 32 and the third step portion 33 jointly form a notch N.

In other words, a first outer radius R31-2 between the outer edge 313 of the first step portion 31 and the central axis C is equal to a second outer radius R32-2 between the outer edge 323 of the second step portion 32 and the central axis C, and is also equal to a third outer radius R33-2 between the outer edge 333 of the third step portion 33 and the central axis C.

Third Embodiment

Figure 7:
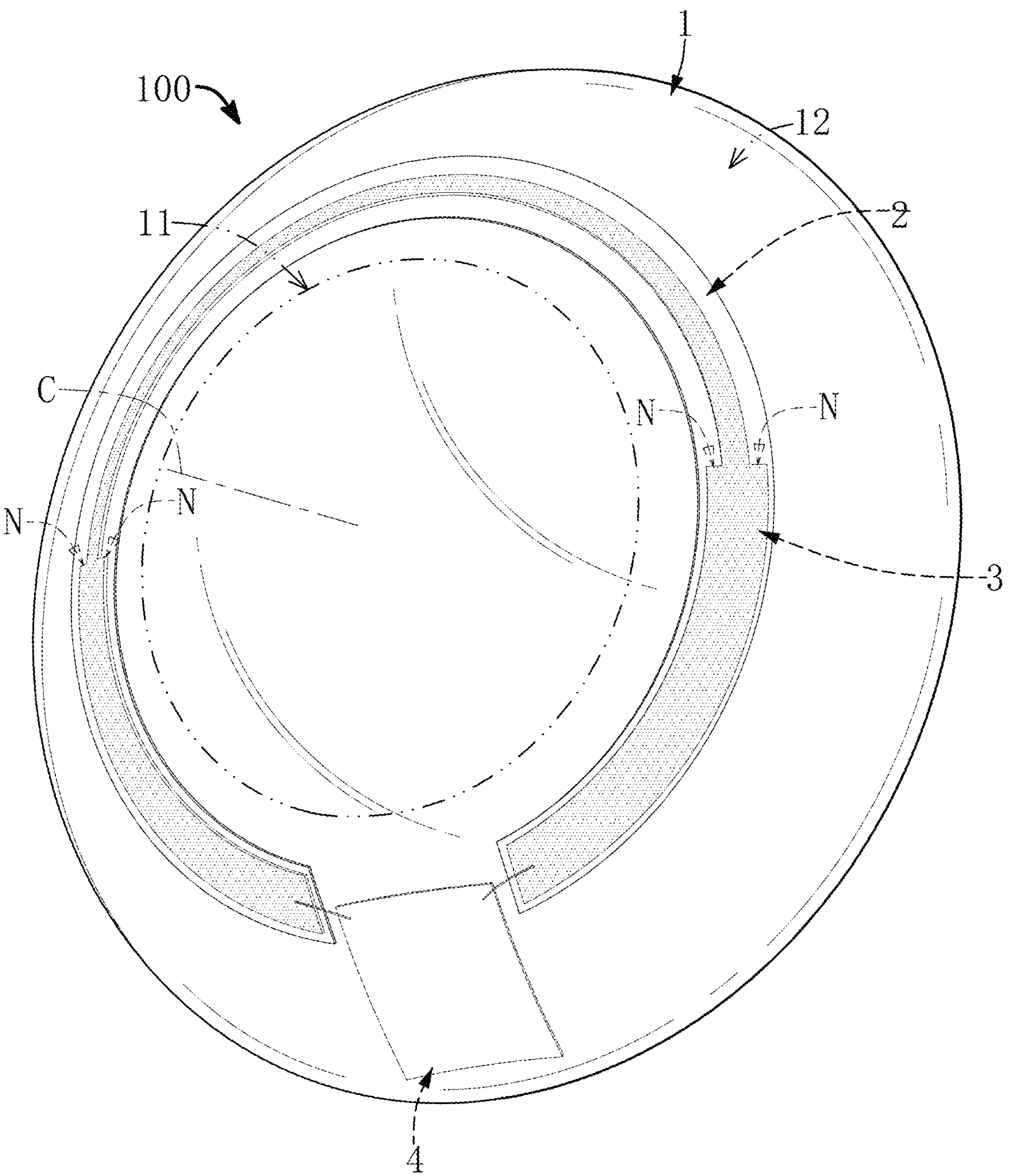
FIG. 7 is a schematic perspective view of the smart contact lens according to a third embodiment of the present disclosure.
Figure 8:
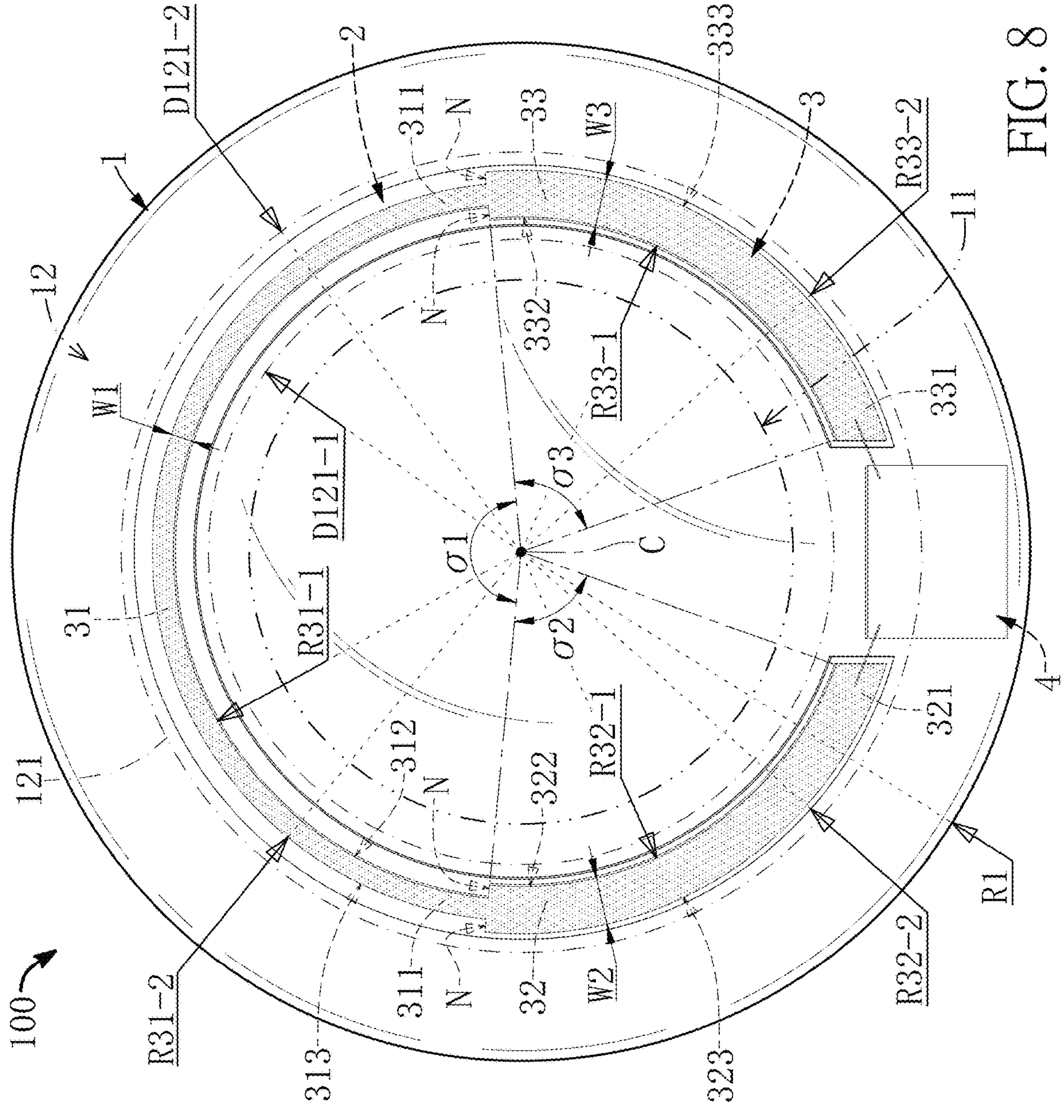
FIG. 8 is a schematic top view of FIG. 7.

Referring to FIG. 7 and FIG. 8, a third embodiment of the present disclosure, which is similar to the first embodiment of the present disclosure, is provided. For the sake of brevity, descriptions of the same components in the first and third embodiments of the present disclosure (e.g., the lens body 1 and electronic chip 4) will be omitted herein, and the following description only discloses different features between the first and third embodiments.

In the present embodiment, an inner edge 312 of the first step portion 31 is spaced apart from each of an inner edge 322 of the second step portion 32 and an inner edge 332 of the third step portion 33 by a same step difference. Moreover, an outer edge 313 of the first step portion 31 is spaced apart from each of an outer edge 323 of the second step portion 32 and an outer edge 333 of the third step portion 33 by a same step difference.

In other words, the outer edge 313 of the first step portion 31 and each of the second step portion 32 and the third step portion 33 jointly form a notch N, and the inner edge 312 of the first step portion 31 and each of the second step portion 32 and the third step portion 33 jointly form a notch N.

Fourth Embodiment

Figure 9:
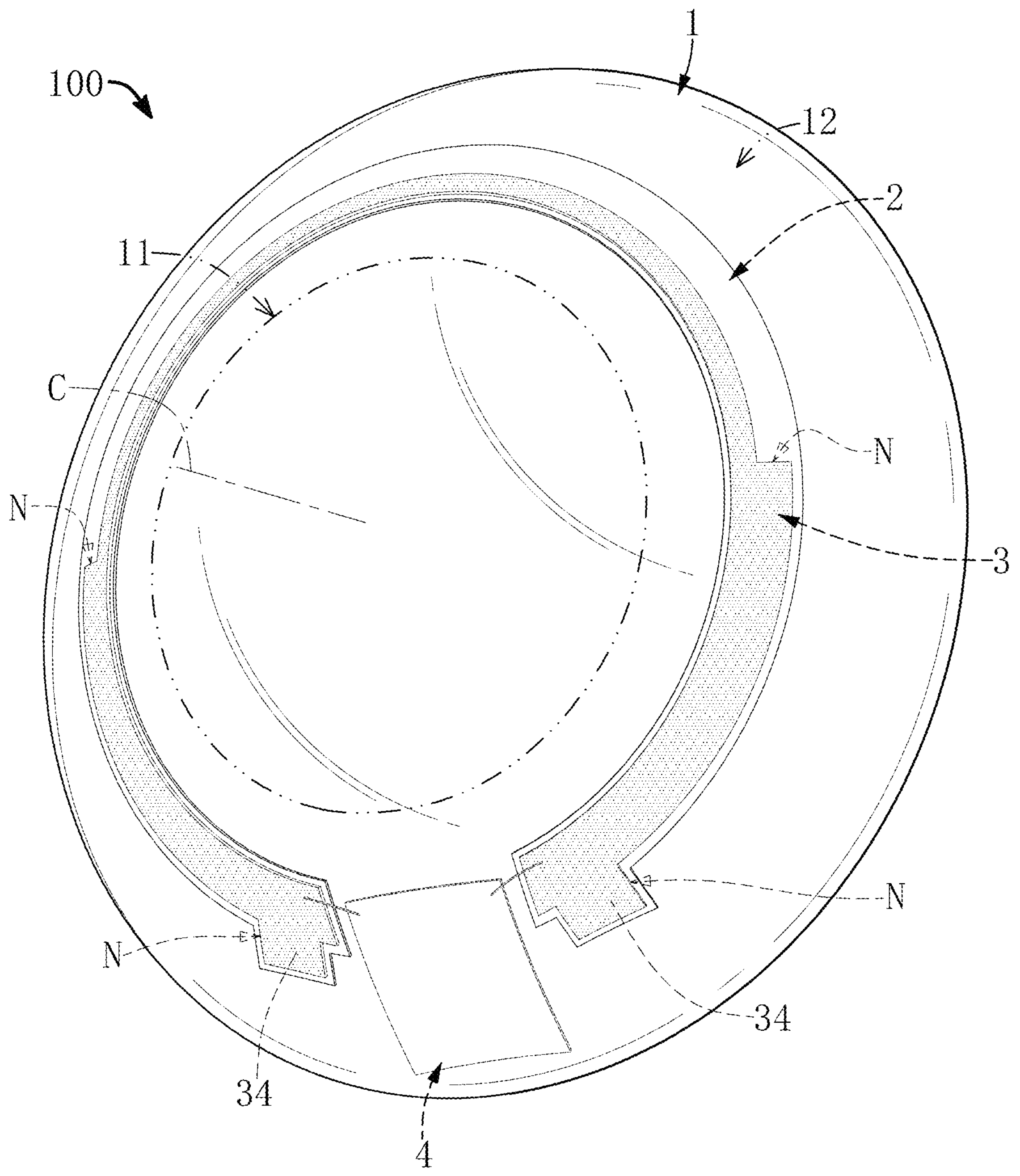
FIG. 9 is a schematic perspective view of the smart contact lens according to a fourth embodiment of the present disclosure.
Figure 10:
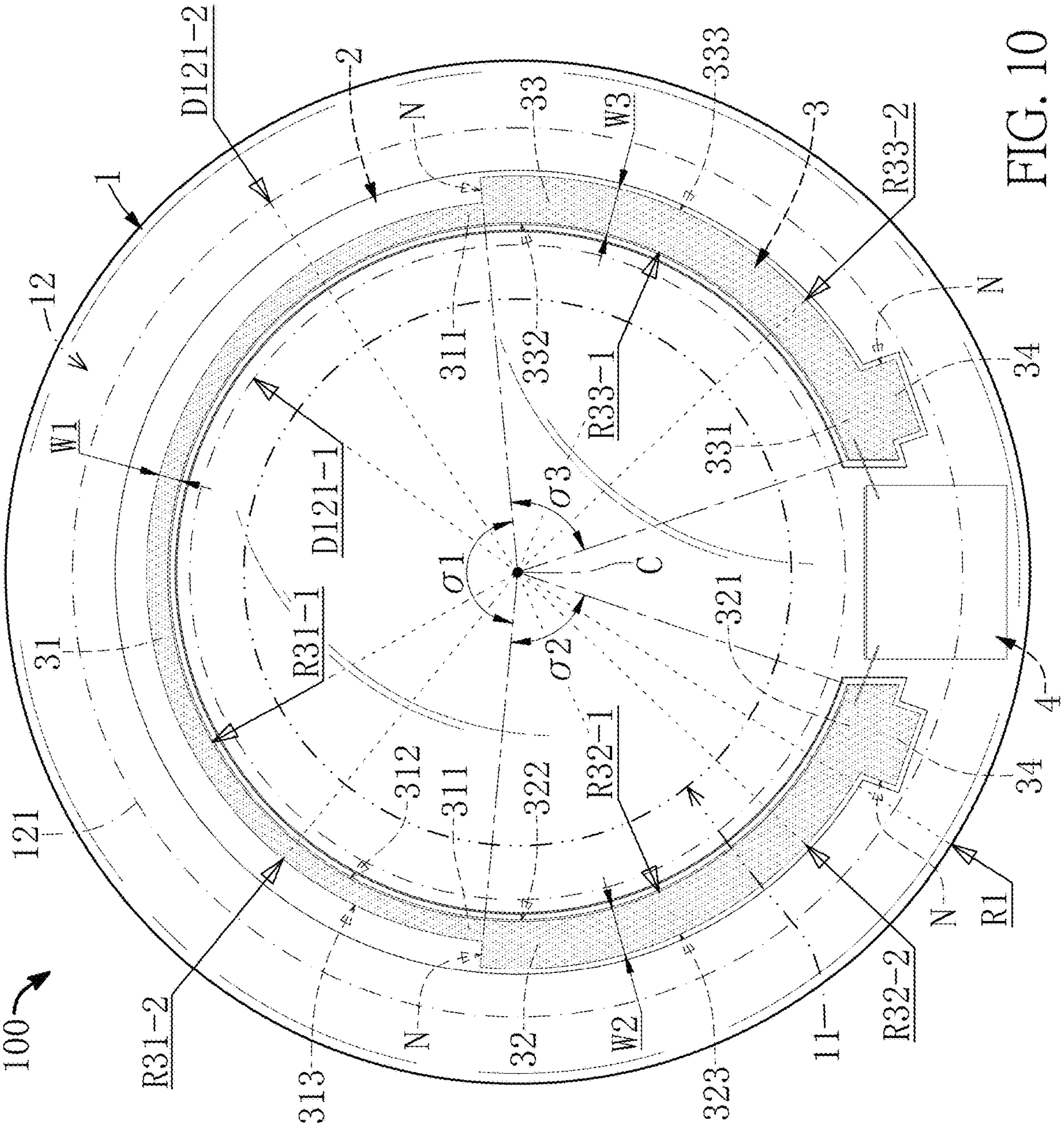
FIG. 10 is a schematic top view of FIG. 9.

Referring to FIG. 9 and FIG. 10, a fourth embodiment of the present disclosure, which is similar to the first embodiment of the present disclosure, is provided. For the sake of brevity, descriptions of the same components in the first and fourth embodiments of the present disclosure (e.g., the lens body 1 and electronic chip 4) will be omitted herein, and the following description only discloses different features between the first and fourth embodiments. In the present embodiment, the stepped-impedance antenna 3 further includes two protrusions 34 respectively connected to the distal end 321 of the second step portion 32 and the distal end 331 of the third step portion 33. Moreover, the two protrusions 34 are respectively arranged on outer sides of the second step portion 32 and the third step portion 33, so that each of the second step portion 32 and the third step portion 33 is cooperated with a corresponding one of the two protrusions 34 to jointly form a notch N.

In addition, the connection relationships of the first step portion 31, the second step portion 32, and the third step portion 33 in the present embodiment are similar to that of the first embodiment and can be adjusted according to the second or third embodiment, but the present disclosure is not limited thereto.

Beneficial Effects of the Embodiments

In conclusion, the smart contact lens of the present disclosure is provided with the first step portion, the second step portion, and the third step portion having specific structural conditions (e.g., a relative arrangement of the first central angle, the second central angle, and the third central angle, and/or a relative arrangement of the first width, the second width, and the third width), so that the stepped-impedance antenna in a limited space can be provided for effectively increasing an equivalent inductance and reducing a resonance frequency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A smart contact lens, comprising:

a lens body including an optical portion and an annular wearing portion that surrounds the optical portion, wherein the optical portion defines a central axis passing through a center of the annular wearing portion;

a stepped-impedance antenna having a circular ring shape and being embedded in the lens body along the annular wearing portion, wherein the stepped-impedance antenna is substantially C-shaped and includes:

a first step portion having a first width and two connection ends, wherein the first step portion has a first central angle with respect to the central axis, and wherein the first central angle is within a range from 160 degrees to 180 degrees;

a second step portion connected to one of the two connection ends of the first step portion and having a second width that is within a range from 180% to 220% of the first width, wherein the second step portion has a second central angle with respect to the central axis; and a third step portion connected to another one of the two connection ends of the first step portion and having a third width that is within a range from 180% to 220% of the first width, wherein the third step portion has a third central angle with respect to the central axis;

wherein a distal end of the second step portion arranged away from the first step portion is spaced apart from a distal end of the third step portion arranged away from the first step portion, the stepped-impedance antenna has a gap between the distal end of the second step portion and the distal end of the third step portion, and a difference between the second central angle and the third central angle is less than or equal to 15 degrees; and an electronic chip that is embedded in the annular wearing portion and that is arranged in the gap between the distal end of the second step portion and the distal end of the third step portion, wherein the electronic chip is electrically coupled to the stepped-impedance antenna for wirelessly transmitting signals.

2. The smart contact lens according to claim 1, wherein a first inner radius between an inner edge of the first step portion and the central axis is equal to a second inner radius between an inner edge of the second step portion and the central axis, and is also equal to a third inner radius between an inner edge of the third step portion and the central axis.

3. The smart contact lens according to claim 1, wherein an inner edge of the second step portion is flush with an inner edge of the third step portion, and an outer edge of the first step portion and each of the second step portion and the third step portion jointly form a notch.

4. The smart contact lens according to claim 1, wherein a first outer radius between an outer edge of the first step portion and the central axis is equal to a second outer radius between an outer edge of the second step portion and the central axis, and is also equal to a third outer radius between an outer edge of the third step portion and the central axis.

5. The smart contact lens according to claim 1, wherein the difference between the second central angle and the third central angle is less than or equal to 5 degrees, and the second central angle is within a range from 45 degrees to 100 degrees.

6. The smart contact lens according to claim 1, wherein the lens body has a radius with respect to the central axis, and the first width is within a range from 4% to 30% of the radius.

7. The smart contact lens according to claim 1, wherein the annular wearing portion defines an annular layout region that has an inner radius being within a range from 4 mm to 5.9 mm and that has an outer radius being within a range from 4.1 mm to 6 mm, and wherein the stepped-impedance antenna is arranged in the annular layout region.

8. The smart contact lens according to claim 1, wherein the second step portion and the third step portion are in a mirror symmetrical arrangement.

9. The smart contact lens according to claim 1, wherein the electronic chip is an application specific integrated circuit (ASIC) chip that is arranged between and connected to the distal end of the second step portion away from the first step portion and the distal end of the third step portion away from the first step portion.

10. A smart contact lens, comprising:

a lens body including an optical portion and an annular wearing portion that surrounds the optical portion;

a stepped-impedance antenna having a circular ring shape and being embedded in the lens body along the annular wearing portion, wherein the stepped-impedance antenna is substantially C-shaped and includes:

a first step portion having a first width and two connection ends, wherein the first step portion has a first central angle that is within a range from 160 degrees to 180 degrees;

a second step portion connected to one of the two connection ends of the first step portion and having a second width that is within a range from 180% to 220% of the first width, wherein the second step portion has a second central angle; and a third step portion connected to another one of the two connection ends of the first step portion and having a third width that is within a range from 180% to 220% of the first width, wherein the third step portion has a third central angle;

wherein a distal end of the second step portion arranged away from the first step portion is spaced apart from a distal end of the third step portion arranged away from the first step portion, the stepped-impedance antenna has a gap between the distal end of the second step portion and the distal end of the third step portion, and a difference between the second central angle and the third central angle is less than or equal to 15 degrees; and an electronic chip that is arranged in the gap between the distal end of the second step portion and the distal end of the third step portion, wherein the electronic chip is embedded in the annular wearing portion and that is electrically coupled to the stepped-impedance antenna.

* * * * *